United States Patent [19]

Atsumi

[11] Patent Number: 4,836,712
[45] Date of Patent: Jun. 6, 1989

[54] ELECTRONIC WORD PROCESSING WITH SEQUENTIAL CHARACTER ATTRIBUTE COMPOUNDING

[75] Inventor: Hiroki Atsumi, Tokyo, Japan

[73] Assignee: Casio Computer Co., Ltd., Tokyo, Japan

[21] Appl. No.: 89,906

[22] Filed: Aug. 24, 1987

Related U.S. Application Data

[63] Continuation of Ser. No. 786,876, Oct. 11, 1985, abandoned.

[30] Foreign Application Priority Data

Dec. 29, 1984 [JP] Japan ................... 59-280853

[51] Int. Cl.$^4$ ............ B41J 5/30; B41J 29/26
[52] U.S. Cl. ........................ 400/22; 400/17
[58] Field of Search ............ 400/17, 22, 110

[56] References Cited

U.S. PATENT DOCUMENTS

| 4,150,902 | 4/1979 | Brescia | 400/17 |
| 4,203,102 | 5/1980 | Hydes | 400/110 |
| 4,323,315 | 4/1982 | Demonke et al. | 400/22 |
| 4,440,129 | 9/1984 | Disbrow et al. | 364/900 |
| 4,511,267 | 4/1985 | Pokorny et al. | 400/110 |
| 4,668,963 | 5/1987 | Tanake et al. | 400/17 |

FOREIGN PATENT DOCUMENTS

| 0066139 | 8/1982 | European Pat. Off. | 340/709 |
| 0119395 | 9/1984 | European Pat. Off. | 364/523 |
| 185280 | 10/1983 | Japan | 400/17 |

OTHER PUBLICATIONS

Tokunaga, "Overprint Circuit" IBM Technical Disclosure Bulletin vol. 26, No. 1, pp. 284–285 6/83.

Primary Examiner—William Pieprz
Attorney, Agent, or Firm—Frishauf, Holtz, Goodman & Woodward

[57] ABSTRACT

Electronic word processing is carried out with a keyboard including character keys and attribute keys. Attribute codes input by the attribute keys are stored in an attribute code memory in accordance with the sequence of attribute key operation. An attribute pattern corresponding to an attribute code read out from the memory is read out from attribute pattern memories, and is printed by a printing section after compounding by an instruction from an attribute compounding designation section.

1 Claim, 3 Drawing Sheets

ELECTRONIC WORD PROCESSING WITH SEQUENTIAL CHARACTER ATTRIBUTE COMPOUNDING0084

This application is a continuation, of application Ser. No. 786,876, filed Oct. 11, 1985 now abandoned.

BACKGROUND OF THE INVENTION

The present invention relates to electronic word processing and, more particularly, an electronic word processing apparatus for compounding a plurality of attribute patterns in any combination with an input character pattern and printing thereby obtained data.

An electronic word processing apparatus, e.g., an electronic typewriter of dot matrix type registers a character pattern, corresponding to a character code input by a key operation. The typewriter edits and prints the patterns in units of lines or pages and allows easy character correction. Therefore, such an electronic typewriter provides better functions than a manual typewriter or an electric typewriter. An electronic typewriter can also print in different modes by compounding attribute patterns with basic character patterns, e.g., underline, enhancement (character thickness is increased), or double width (character size is doubled) modes.

In such an electronic typewriter, a slide switch or the like is used to designate compounding of such attribute patterns. For example, underline, enhancement, and double width modes are designated by setting the slide switch at three positions. This means that only a single attribute pattern can be assigned to each position of the switch, and only this pattern can be compounded with the basic character pattern. The number of printing modes provided is thus limited.

SUMMARY OF THE INVENTION

It is, therefore, an object of the present invention to provide an electronic word processing apparatus and method which can compound a plurality of attribute patterns in any combination with an input character pattern and print the obtained data.

In order to achieve the above object of the present invention, there is provided an electronic word processing apparatus comprising keyboard means having at least character keys; attribute code memory means for storing a plurality of attribute codes; compounding means for compounding an attribute pattern corresponding to an attribute code stored in the attribute code memory means with an input character pattern input by operation of a character key of the keyboard means; and outputting means for at least outputting a character pattern compounded with the attribute pattern.

With the electronic word processing apparatus and method of the present invention, a plurality of attribute patterns can be compounded with an input character pattern without being limited to the number of attribute pattern memories for storing individual attribute patterns to be designated, so that the number of printing modes can be increased. When an attribute key is operated, the corresponding attribute code is stored in a special attribute code memory. The attribute code can be read out and compounded with not only a specific single character but also with a plurality of characters continuously under the control of a control section. In addition, first and second memories can be used. When a plurality of attribute patterns are compounded with a single character or a plurality of characters, the compounding sequence can be designated in accordance with the sequence of key operations. For example, when underline, shading and enhancement are compounded, if enhancement is designated in the final step, underline and shading attribute patterns designated prior to the final step can also be printed enhanced.

DETAILED DESCRIPTION OF THE PREFERRED EMBODIMENT

The preferred embodiment of the present invention will be described with reference to the accompanying drawings.

Figure 1:
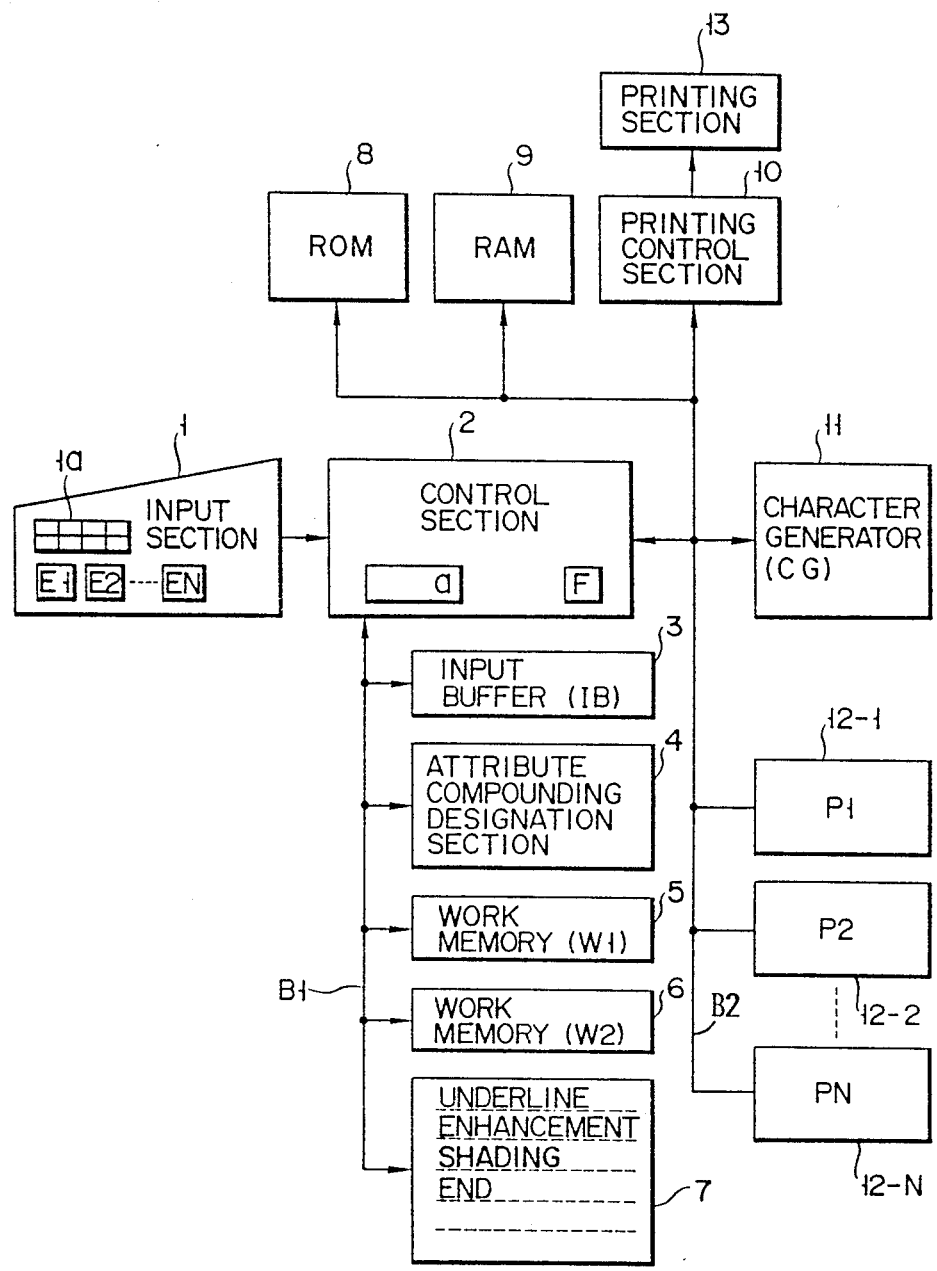
FIG. 1 is a block circuit diagram of an electronic word processing apparatus according to an embodiment of the present invention.

FIG. 1 is a block circuit diagram of an embodiment of the present invention.

An input section 1 is an input circuit comprising a keyboard and has attribute keys E1 to EN in addition to character keys 1a. The input section 1 supplies to a control section 2 a code corresponding to a key depressed by the operator. The control section 2 has a flag register F and an operation register a for storing an address pointer of an attribute code memory 7 to be described later. B1 and B2 are buses connected to the control section 2. The bus B1 connects an input buffer (IB) 3, an attribute compounding designation section 4, a work memory (W1) 5, a second work memory (W2) 6, and the attribute code memory 7. The bus B2 connects a read-only memory (ROM) 8, a random access memory (RAM) 9, a printing section 10, a character generator (CG) 11, and attribute pattern memories (P1-PN) 12-1 to 12-N. The control section 2 performs control procedures to be described later and generate designated attribute patterns through the buses B1 and B2. A printing section 13 for printing on output paper is connected to a printing control section 10. The control section 2 controls the circuits connected to the buses B1 and B2, operates in correspondence with a code input from the input section 1, and prints in correspondence with the code of the printing section 13.

The attribute keys E1 to EN of the input section 1 are used to designate attribute patterns. For example, the key E1 designates underline, the key E2 designates enhancement, and the key E3 designates shading. When each key is depressed once, the corresponding mode is set. Upon being depressed again, the set mode is reset. The input code is stored in the attribute code memory 7. When an attribute key is depressed, corresponding data is supplied from the input section 1 to the control section 2, and the control section 2 checks if an empty area is available in the attribute code memory 7. When no empty area is available, an input error is displayed on a display (not shown). When an empty area is available, the input attribute code is stored from the starting address of the empty area and an end code is stored in the next area. An end code represents that an area of the memory 7 following the end code is an empty area. Storage of the next attribute code can be performed by detecting the end code and storing the input code in the area following the detected end code. A flag in the flag register F is set to level "1" to indicate that the corresponding attribute code is stored. When the attribute key is depressed again, the area of the attribute code memory 7 storing the input attribute code is cleared. The areas following the cleared area are sequentially shifted back to store the attribute code from the start address. This shift operation is continued to an end code. When all the attribute codes of the memory 7 are cleared, the flag register F is cleared or reset to "0".

A key operation sequence for printing characters compounded with attribute patterns will be described below. When an attribute pattern is to be compounded with a given character and the character with the attribute pattern is to be printed, the corresponding attribute key is operated before operating the character key. For example, when attributes are to be compounded with a character in the order of underline, enhancement, and shading, the underline attribute key E1, the enhancement attribute key E2 and the shading attribute key E3 are depressed in the order named. When the character key is depressed next, the character is underlined, enhanced and has its shading. In order to cancel a given attribute pattern which is already designated, the corresponding attribute key is depressed again. For example, when the key E3 is depressed again and then the character key is depressed, the character is underlined and enhanced but does not have its shading.

Figure 2:
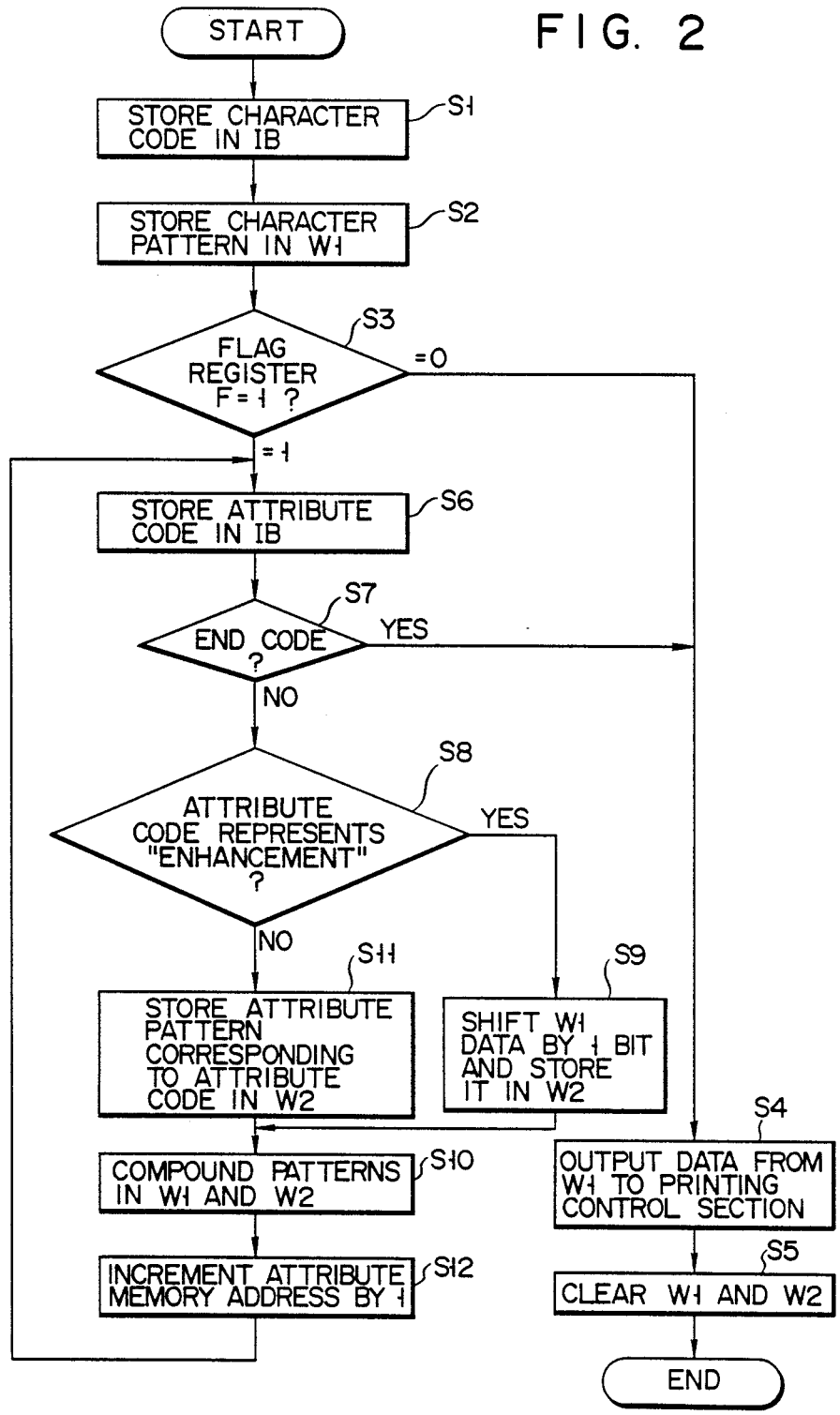
FIG. 2 is a flow chart for explaining the mode of operation of the electronic word processing apparatus of the present invention.

FIG. 2 shows a flow chart of the control sequence of the control section 2 when a character key is depressed. When a character key is depressed (START), a character code corresponding to the operated key is stored in the input buffer IB (S1). In the next step S2, a character pattern corresponding to a previously input character code is read out from the character generator (CG) 11 and the character pattern is stored in the work memory (W1) 5. Upon executing steps S1 and S2, the character pattern of a character input from the input section 1 is stored in the work memory (W1) 5. It is then checked in step S3 if the flag register F is "1" or "0". The flag register F stores a flag which indicates if the attribute code to be compounded with an input character has been stored in the attribute code memory 7.

When it is determined in a decision step S3 that the flag register F is "0" (=0), there is no need to execute compounding of an attribute pattern, and the character pattern stored in the work memory (W1) 5 is supplied to the printing control section 10 in step S4. In order to allow processing of the next character code, the contents of the work memories (W1, W2) 5 and 6 are cleared, and printing control of the character ends. When the content of the work memory (W1) 5 is supplied to the section 10 in step S4, the section 10 supplies printing data, i.e., the character pattern to the printing section.

When it is determined in step S3 that the flag register F is "1" (=1), the following processing is performed. The attribute code stored in the first area of the memory 7 is read out and stored in the input buffer (IB) 3 (S6). It is then checked in step S7 if the stored code is an end code. The following steps to be described below are sequentially performed starting with step S6. Therefore, step S7 is performed immediately after step S6 to detect an end of read operation of the attribute code. If an end code is not detected (NO), the readout attribute code is again processed. In this embodiment, compounding of an enhancement pattern is performed separately from that of other attribute patterns. It is first checked in step S8 if the attribute code stored in the input buffer (IB) 3 represents enhancement. When the code represents enhancement (YES), data of the work memory (W1) 5 is shifted by one bit and is stored in the work memory (W2) 6 (S9). This shifting is for enhancing the character, and can be performed in either the right and left directions. The contents of the work memories (W1, W2) 5 and 6 are compounded, and the obtained data is stored in the work memory (W1) 5 (S10). Upon this processing, the shifted and non-shifted contents are compounded. Therefore, when the contents are shifted to the right or left, each vertical part of the character is thickened by one bit.

When the attribute code does not represent enhancement (NO) in step S8, if the attribute pattern corresponding to the attribute code represents, e.g., underline, an attribute pattern memory for storing the underline attribute pattern is selected from the memories P1 to PN, and the readout underline pattern is stored in the work memory (W2) 6 (S1). Then, compounding operation as described above is performed (S10).

The compounding step of the attribute pattern is performed by the section 4. One attribute pattern is compounded with the pattern stored in the work memory (W1) 5, and the obtained data is stored in the work memory (W1) 5. The next attribute code to be compounded and the address pointer of the code next to be read out from the memory 7 are both incremented (S12), and the above steps are repeated from step S6. The control section 2 provides a compounding effect of an attribute pattern by the above-mentioned operation.

When steps S6 to S12 are repeated as mentioned above, the contents of the memory 7 are sequentially read out until a pattern to be stored in the work memory (W1) 5 becomes a predetermined one. When such a predetermined pattern is obtained, an end code is read out from the memory 7. When this happens, the decision at step S7 is YES, so that the above-described steps S4 and S5 are performed to supply data to the printing section 13, which prints the supplied data.

Figure 3:
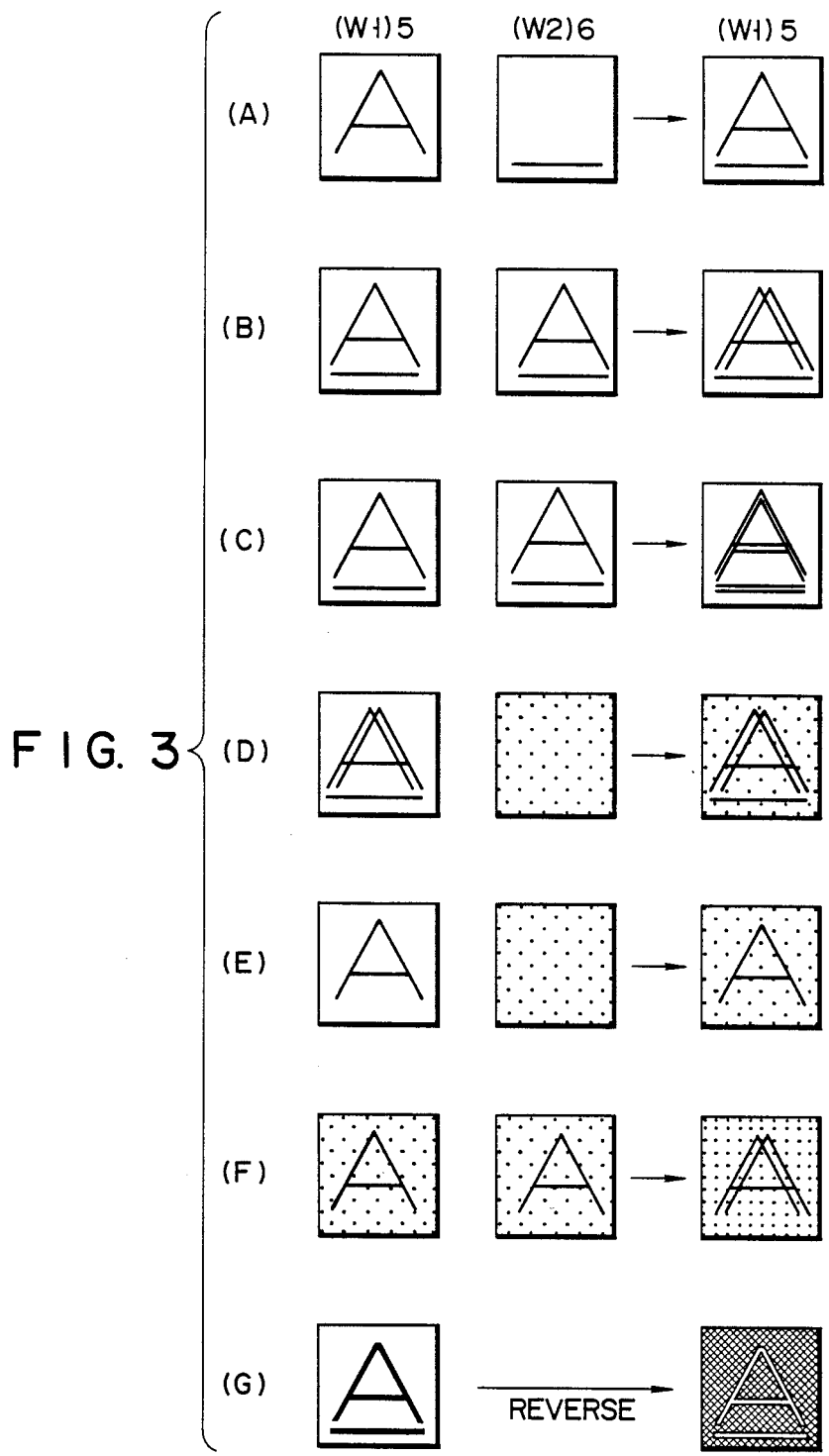
FIGS. 3A to 3G show patterns stored in work memories shown in FIG. 1.

FIGS. 3(A) to 3(G) show contents of the attribute patterns, e.g., underline, enhancement and shading, and compounded patterns thereof stored in the work memories (W1, W2) 5 and 6. A character pattern exemplified in this case is letter A. FIG. 3(A) shows the case of underlining the letter. In this case, the pattern of the letter A stored in the work memory (W1) 5 and the underline pattern stored in the work memory (W2) 6 are compounded, and the obtained result is stored in the work memory (W1) 5. FIG. 3(B) shows the case of enhancing the letter A. A pattern shifted to the right in step S9 is stored in the work memory (W2) 6. The original character pattern and the shifted character pattern are compounded, and the obtained data is stored in the work memory (W1) 5. Thus, the pattern in the work memory (W1) 5 is an enhanced pattern. Since the shifting direction for enhancement is the lateral direction, an enhancement effect is not obtained for the underline. However, when the pattern is shifted vertically, the underline is also emphasized and rendered thicker, as shown in FIG. 3(C). FIG. 3(D) shows the case wherein the letter A has shading. The shading pattern is stored in the work memory (W2) 6 and is compounded with the pattern stored in the work memory (W1) 5. The obtained data is stored in the work memory (W1) 5. As described above, the underlined, enhanced and shading pattern(s) is stored in the work memory (W1) 5. This pattern is supplied to the section 10 which controls the section 3 to print it. These attribute patterns are compounded in the order corresponding to the attribute codes stored in the memory 7 by operating the corresponding attribute keys. Therefore, when enhancement is designated last, the shading pattern is also enhanced, as shown in FIGS. 3(E) and 3(F).

In the above-mentioned operation, printing is performed in units of characters. However, character codes and special codes input from the input section 1 may be stored in units of lines or pages, and the contents of the memory (RAM) 9 can be read out in units of characters to provide a similar effect.

The control section 2 executes the above sequence in accordance with a program stored in the ROM 8. Thus, in accordance with this program, printing (in units of characters), storage in the RAM 9 or printing (in units of lines or pages) is performed upon each input from the input section 1.

In the above embodiment, compounding of a plurality of attribute patterns is designated at the section 4. However, as shown in FIG. 3(G), other functions such as an inversion are also designated by the section 4.

What is claimed is:

1. A method of obtaining a compounded pattern of at least one attribute which includes at least an enhancement for a character to be printed by an electronic word processing apparatus comprising keys character keys and attribute keys for adding at least one selected attribute to a character and including a code key for pattern enhancements, a character pattern memory, an attribute pattern memory, a control means and a printing section, the method comprising:

inputting a character to said control means by operation of one of said character keys;

inputting, to said control means by operation of said keys, at least one attribute pattern including an enhancement code in a predetermined sequence of key operations;

reading out from said character pattern memory a character pattern in accordance with the character input by operation of one of said character keys;

generating a compounded pattern by combining the read-out character pattern and those of said attribute patterns which were inputted by said keys before the inputting of said enhancement code, and performing enhancement on the compounded pattern as obtained prior to inputting of said enhancement code in accordance with said inputted enhancement code;

outputting the enhanced compounded pattern, obtained responsive to all of said inputted attribute patterns including said inputted enhancement code in said compounded pattern generating step, to said printing section.

* * * * *